United States Patent [19]
Garrett

[11] Patent Number: 5,470,379
[45] Date of Patent: Nov. 28, 1995

[54] MEMBRANE PLANT: AUTOMATIC CONTROL OF

[75] Inventor: Michael E. Garrett, Woking, England

[73] Assignee: The BOC Group plc, Windlesham, England

[21] Appl. No.: 1,946

[22] Filed: Jan. 7, 1993

Related U.S. Application Data

[63] Continuation of Ser. No. 873,500, Apr. 23, 1992, abandoned, which is a continuation of Ser. No. 551,582, Jul. 11, 1990, abandoned.

[30] Foreign Application Priority Data

Jul. 19, 1989 [GB] United Kingdom ............ 8916510

[51] Int. Cl.⁶ ................................................ B01D 53/22
[52] U.S. Cl. .................. 96/4; 55/210; 95/12; 95/54; 96/8
[58] Field of Search ................................. 55/16, 18, 21, 55/158; 95/8, 12, 45, 54; 96/4–14

[56] References Cited

U.S. PATENT DOCUMENTS

| | | | |
|---|---|---|---|
| 3,339,341 | 9/1967 | Maxwell et al. | 55/158 X |
| 3,922,149 | 11/1975 | Ruder et al. | 55/21 |
| 3,930,813 | 1/1976 | Gessner | 55/16 |
| 3,930,814 | 1/1976 | Gessner | 55/21 X |
| 4,397,661 | 8/1983 | King et al. | 55/158 |
| 4,421,529 | 12/1983 | Revak et al. | 55/21 X |
| 4,472,176 | 9/1984 | Rubin | 55/158 X |
| 4,806,132 | 2/1989 | Campbell | 55/18 X |
| 4,857,082 | 8/1989 | DiMartino, Sr. et al. | 55/21 X |
| 4,863,492 | 9/1989 | Doshi et al. | 55/21 X |
| 4,944,776 | 7/1990 | Keyser et al. | 55/21 X |

FOREIGN PATENT DOCUMENTS

| | | | |
|---|---|---|---|
| 0051469 | 5/1982 | European Pat. Off. | 55/16 |
| 0060693 | 9/1982 | European Pat. Off. | 55/16 |
| 0075431 | 3/1983 | European Pat. Off. | 55/16 |
| 63-236517 | 10/1988 | Japan | 55/16 |
| 2005152 | 4/1979 | United Kingdom . | |

OTHER PUBLICATIONS

Hitachi Ltd, *Patent Abstracts of Japan*, "Air Separation Apparatus", vol. 12, No. 190 (C–474) (2887) (Feb. 5, 1988) for JP–A–62–191,404 (Aug. 21, 1987).

Toray Ind. Inc., *Patent Abstracts of Japan*, "Generator of Oxygen–Enrich Air", vol. 13, No. 190 (C–593) (3538) (May 8, 1989) for JP–A–118,425 (Jan. 23, 1989).

*Primary Examiner*—Robert Spitzer
*Attorney, Agent, or Firm*—R. Hain Swope; Larry R. Cassett

[57] ABSTRACT

Air is separated in a vessel housing gas separation membranes. A flow control valve controls the passage of air to an inlet header of the vessel. The setting of the valve is adjusted in accordance with the level of oxygen impurity in product nitrogen leaving the vessel for an outlet header. A second flow control valve is provided and is of a kind whereby product nitrogen is able to be delivered at a constant flow rate over a range of different pressures upstream thereof. Accordingly, the apparatus is able to deliver nitrogen at a desired purity and flow rate.

6 Claims, 2 Drawing Sheets

MEMBRANE PLANT: AUTOMATIC CONTROL OF

This is a continuation of application Ser. No. 07/873,500, filed 23 Apr. 1992, a continuation of application Ser. No. 07/551,582, filed 11 Jul. 1990, both now abandoned.

TECHNICAL FIELD

This invention relates to the separation of gas mixtures by semi-permeable membranes.

BACKGROUND OF THE INVENTION

The use of semi-permeable membranes to separate gas mixtures has become a well known technique in the production of industrial gases. Known plants for the separation of gas mixture by such membranes are constructed so as to present a large surface area of membrane to the gas mixture to be separated. For example, such plants may employ a multitude of identical, elongate, hollow fibres which are formed of a suitable semi-permeable membrane and which extend in parallel to one another. The fibres are appropriately mounted in a pressure vessel. The gas mixture to be separated is fed into the pressure vessel at or near one end outside the fibres. It flows longitudinally of the fibres. The insides of the fibres are maintained at a pressure lower than that which obtains on the outside of them. The components of the gas mixture diffuse through the membranes at different speeds. A fast permeating component passes more and more to the lower pressure side. Accordingly, the gas on the outside of the fibres (high pressure side) becomes richer in the slower permeating component as it flows along the outside of the fibres, and a product gas, enriched in the more slowly diffusing component, may be withdrawn at pressure from the end of the pressure vessel opposite that at which the feed gas is introduced. The permeate gas is enriched in the faster diffusing component. The permeate gas is withdrawn from the inside of the fibres at the same end as that at which the feed gas is introduced.

The performance of the membrane material may be described by two properties, namely its permeability (or flux) and its selectivity. The flux or permeability is basically the rate at which a permeable component of the mixture diffuses through the membrane. Its absolute value depends upon the thickness and surface area of the membrane, the pressure difference across the membrane and the ambient temperature, among other factors. The selectivity of the membrane determines the ratio of the permeabilities of the two components of the gas mixture to be separated. It is therefore desirable that in any separation the membrane has both a high permeability and a large selectivity.

The requirements of an industrial process for a particular gas are often stated in terms of the purity of the gas and its flow rate. It is thus desirable for any commercial apparatus for supplying the gas to be capable of producing the product at a predetermined purity (or maximum tolerable purity) and a predetermined flow rate. Conventionally, when an apparatus using semi-permeable membranes is used to supply nitrogen by separating it from air, the incoming air, after purification, is supplied at a constant superatmospheric pressure, while the permeate gas typically flows out of the vessel at approximately atmospheric pressure. The product nitrogen is withdrawn through a flow control valve whose setting determines the purity of the product. The effect of reducing the size of the passage through the valve is to reduce the flow rate of the gas over the membranes and hence increase the average residence time of each gas molecule within the separation vessel. Accordingly, the oxygen molecules are given more opportunity to diffuse through the membrane, and a purer product is given. By the same token, increasing the size of the passage through the valve will increase the flow rate of product but also increase its impurity level as oxygen molecules are given less average time to diffuse through the membranes. Thus, in commercial practice, the flow control valve can be given a particular setting to give product gas at a given purity and given flow rate.

In practice, however, the apparatus will not produce product gas of the same purity day in and day out during operation over a prolonged period of time. There are four factors which tend to cause the purity of the product gas to vary. The first of such factors is the temperature to which the membrane is subjected. The higher the temperature the greater the rate of permeation of the components through the membrane. If the membrane vessel is supplied with an air feed at a constant flow rate, for example, from a dedicated compressor, then an increased permeability will increase the purity of the product but reduce its yield. Further, if a temperature variation is the result of changing ambient conditions, and the air (in the case of air separation) is supplied by a compressor, increasing temperature will decrease the mass flow rate of air delivered by the compressor, so the tendency of increasing temperature to give product nitrogen at a lower flow rate will be amplified.

A second factor affecting the performance of semi-permeable membranes is the effect of contaminants in the gas mixture. Although, in commercial practice, care is taken to ensure a supply of clean gas to the high pressure side of the membranes, even the cleanest stream tends to contain some contaminant vapours or even tiny particles which over a period of time may lodge on the membrane material and cause its permeability to decrease. Such contamination will have the effect of tending to increase the impurity level in the product gas. A third factor is varying barometric pressure. This factor can be particularly important if the membrane vessel is so operated that the waste gases are withdrawn at atmospheric pressure. In practice, atmospheric pressure can vary up to 5% either side of the mean of 760 mm of mercury. Although the net effect of such variations is reduced by using a relatively high air supply pressure, their effect cannot be entirely eliminated. The fourth factor is the tendency for the membrane materials themselves, typically being organic polymers, to undergo an ageing effect over their life time in the membrane vessel. Ageing is not necessarily a relatively slow phenomenon which manifests itself only after a period of years. The ageing effect can be exponential in character with the major change occurring in the early part of the membrane's operational life.

Although the above factors may be mitigated by appropriate adjustment of the flow control valve by the operator, most membrane gas separation plants are designed for unattended operation. Moreover, effects such as ambient temperature changes can be fairly rapid and occur over a few hours which would make necessary frequent operator attention to the valve setting. Various methods have been suggested to compensate for these factors, such as using a temperature control device on the feed air to the membrane vessel, either to refrigerate it or heat it, but in any event keeping it at a stable temperature. However, the operation of these devices is complicated and they are still inadequate to give totally stable operating conditions. Nor do they compensate for longer term loss of membrane performance as a result of ageing or contamination: nor do they compensate for a varying barometric pressure.

It is the aim of the present invention to provide a gas separation apparatus which makes use of semi-permeable membranes and which has control means able to be operated automatically to mitigate fluctuations in product purity that would otherwise be caused by the factors discussed above.

SUMMARY OF THE INVENTION

According to the present invention there is provided apparatus for separating a gas mixture comprising a vessel housing semi-permeable membranes effective to separate the mixture and having an inlet for the gas mixture to be separated, a first outlet for product gas and a second outlet for a gas stream of different composition from that of the product gas, a first flow control valve for controlling the flow of gas to said inlet, means for adjusting the position of said first flow control valve in response to analysis of the composition of the product gas, and a second flow control valve for controlling the flow of product gas from the first outlet, said second control valve capable of delivering product gas at a constant flow rate over a range of different pressures upstream thereof.

By the term "semi-permeable membrane" as used herein is meant a membrane suitable for use in separating gas mixtures.

Preferably, the control means for the first flow control valve includes means for comparing a signal from a gas analyser sensitive to the concentration of a component in the product gas (typically an impurity) with a reference signal representative of the desired level of that impurity, and for generating a signal to change the position of the first flow control valve in the event that there is a difference between the two signals being compared. Suppose for example, in the separation of product nitrogen from air, the oxygen impurity level exceeds a desired value. A signal will be generated to change the setting of the first flow control valve to reduce the pressure drop there across, i.e. to open the valve. The pressure on the product side of the membranes is therefore increased and thus the flux through the membranes is increased with the result that the level of impurity in the product falls. Similarly, if the impurity level falls below a given value a signal is generated to reduce the size of the passage through the first flow control valve and thereby increase the pressure drop there-across with the result that the rate of permeation of gas through the membrane is reduced and the impurity level increases again.

The product gas is typically the non-permeate gas.

The apparatus according to the invention typically employs a compressor of the gas mixture to be separated which is of the constant displacement type and can therefore operate with a variety of discharge pressures if so desired.

The second flow control valve is preferably of a kind which has an orifice upstream of a valve member, a pilot gas chamber which is in communication with the upstream side of the orifice and which is bounded by one side of a diaphragm which on its other side is subject to the pressure downstream of the orifice. An increasing pressure difference across the diaphragm causes the diaphragm to urge a valve member in a valve closing direction, whereby to maintain substantially constant the flow of gas delivered by the valve. This arrangement is different from that of a conventional pressure regulating valve in which an increase in pressure across the diaphragm acts in a valve opening direction.

Preferably, a valve regulating the pressure upstream thereof is located downstream of the second control valve so as to make it possible to maintain in operation of the apparatus a constant pressure intermediate the second control valve and the pressure regulating valve.

BRIEF DESCRIPTION OF THE DRAWINGS

The apparatus according to the invention will now be described by way of example with reference to the accompanying drawings, in which.

DETAILED DESCRIPTION OF THE DRAWINGS

Figure 1:
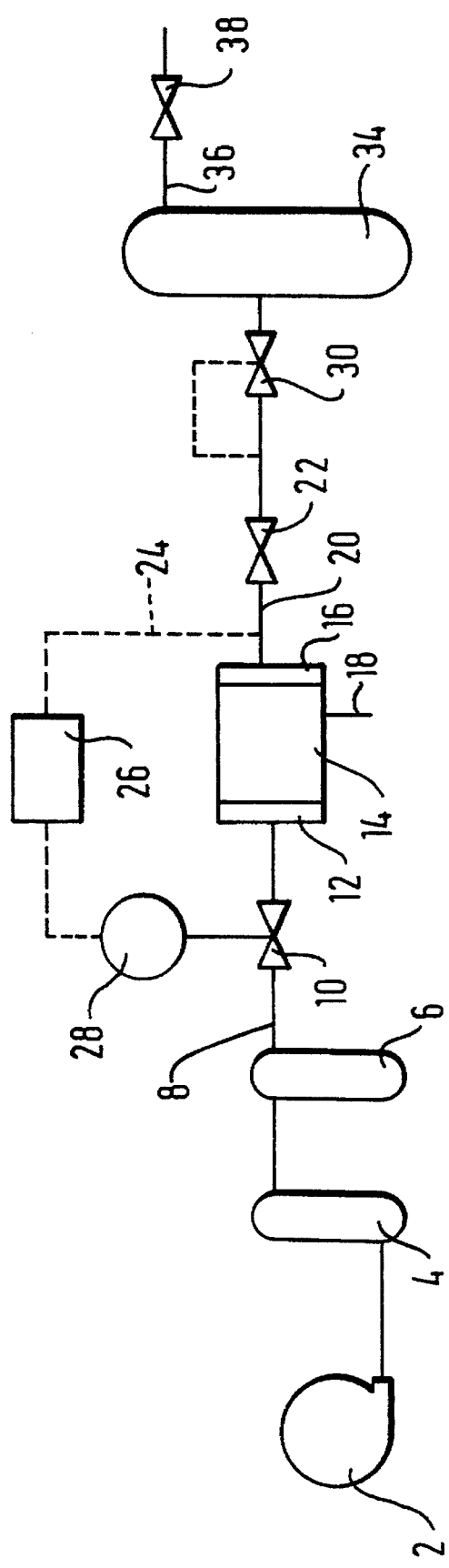
FIG. 1 is a schematic circuit diagram illustrating one embodiment of the apparatus.

Referring to FIG. 1 of the drawings there is shown apparatus that makes use of semi-permeable membranes to separate nitrogen from air. The apparatus includes a compressor 2 of a constant displacement type. The compressor 2 supplies compressed air to a first receiver vessel 4 and from there to filtration vessel 6 that contain filters adapted to remove particulates and oil contamination from the air. The filtered air flows from the vessel 6 into an air pipeline 8 in which a first flow control valve 10 is located. The pipeline 8 terminates in an inlet header 12 of a vessel 14 housing semi permeable membranes able to effect by differential permeation rates a separation as between oxygen and nitrogen. The membrane vessel 14 may be arranged conventionally and can be constructed with sheets of the semi-permeable membrane either laid flat, stacked or spirally wound, or more commonly, the vessel 14 contains a multiplicity fine tubes some of the membranes with the feed gas being applied either to the outside or to the bore of these tubes. The individual fine tubes can themselves be constructed in a number of ways, for example, they may simply be drawn tubes of the semi-permeable material. Alternatively, they may consist of a relatively porous substrate material which is coated with another material either on the inside or the outside which may itself act as a semi-permeable membrane.

The vessel 14 has an outlet header 16 which collects non-permeate gas and enables it to flow to a product gas pipeline 20. The vessel 14 also has an outlet 18 for permeate gas.

A second flow control valve 22 is located in the pipeline 20. The flow control valve 22 is of a kind which is able to deliver gas at a constant flow rate notwithstanding the occurrence of pressure fluctuations upstream thereof. Intermediate the header 16 and the flow control valve 22 there is disposed a capillary tapping 24 from the pipeline 20 that leads to an analyser 26 which is capable of analysing in real time for a component of the product gas. In the example of producing a nitrogen product, the analyser 26 analyses for oxygen and is able to determine the level of oxygen impurity in the nitrogen. The analyser 26 conveys signals to a valve controller 28 which is able to adjust the setting of the first flow control valve 10 in a manner which will be described below.

There is preferably located in the pipeline 20 a pressure regulator 30 which is a valve which in operation maintains a constant pressure in the pipeline intermediate the second flow control valve 22 and itself. The pipeline 20 terminates in a product nitrogen receiver vessel 34 which has an outlet 36 with a manually operable flow control valve 38 disposed therein. The valve 38 can be set to deliver product nitrogen at the desired rate.

In typical operation, the apparatus shown in FIG. 1 may be set to deliver nitrogen (containing up to 1% by volume of oxygen as an impurity) at a flow rate of 50 standard cubic meters per hour to the vessel 32. Should the oxygen impurity level reach 1%, by the analyser 26 will generate an appropriate signal to the valve controller 28 with the result that the valve 10 is adjusted so as to open it more, that is to say, to let gas through at a faster rate, thus reducing the pressure drop thereacross. Accordingly, the product side of the membranes in the vessel 14 are subjected to a higher pressure which in turn increases the rate of permeation of oxygen therethrough. The concentration of oxygen impurity in the product nitrogen thus becomes less. Moreover, the effect of the valve 22 is to maintain the flow rate therethrough constant even though the pressure upstream of it is increased by virtue of the opening of the valve 10. Thus, there is no increase in flow rate through the membrane vessel 14 to counteract the pressure increase on the product side of the membranes.

If the analyser 26 detects that the concentration of oxygen impurity in the product line has fallen below a chosen value <say 1% by volume) the analyser will generate a signal effective for the valve controller 28 to change the setting of the valve 10 so as to reduce the size of the passage therethrough and thus increase the pressure drop thereacross. There is hence a reduced pressure on the product side of the membranes in the vessel 14 with the result that the rate of permeation of oxygen impurity through the membranes is reduced and thus the concentration of oxygen impurity in the product gas delivered to the pipeline 20 increases. The setting of the valve 22 changes automatically so as to maintain the flow rate of product nitrogen that it delivers substantially constant. It can thus be appreciated that the apparatus shown in FIG. 1 is capable of being set up so that it operates automatically to keep the concentration of oxygen impurity in the nitrogen product at 1% by volume irrespective of changes in the performance of the membranes.

Figure 2:
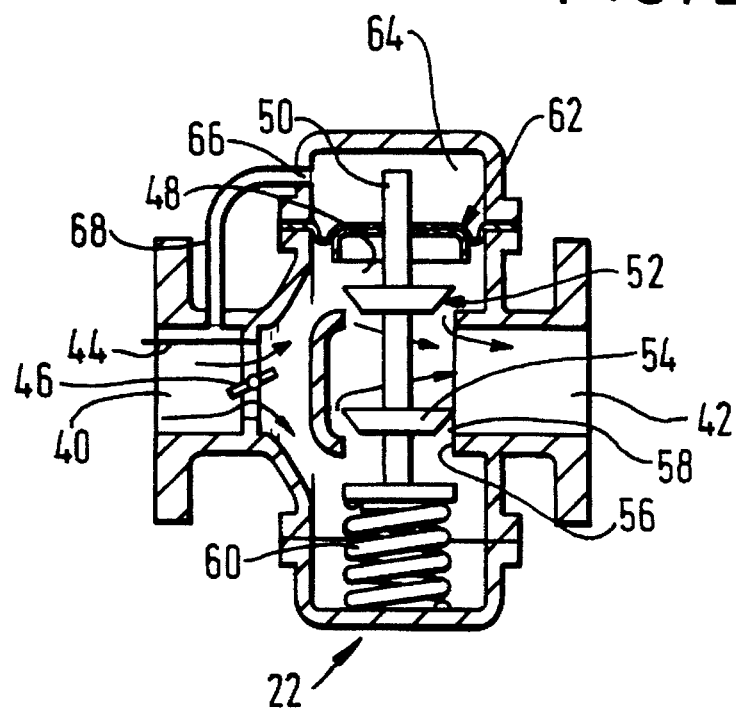
FIG. 2 is a schematic side elevation of the flow control valve in the product gas pipeline of the apparatus shown in FIG. 1.

The construction of the valve 22 is illustrated in FIG. 2 of the accompanying drawings. The valve has an inlet port 40 which communicates with the outlet header 16 for product gas from the membrane vessel 14, and an outlet port 42 which is in line with the port 40 and which is in communication with the upstream side of the pressure regulating valve 30. A calibrated orifice 44 is mounted in the inlet port 40. A butterfly member 46 co-operates with the orifice 44. On the downstream side of the orifice 44 there is disposed a main valve chamber 48. In the chamber 48 is located a generally vertical shaft 50 carrying valve members 52 and 54. Valve members 52 and 54 co-operate with a valve seat 56 to define a generally annular opening 58 which controls the velocity of flow of gas through the valve. The valve members 52 and 54 are able to be moved towards the valve seat 56 to reduce the size of the opening 58 by downward displacement of the shaft 50 against the bias of a compression spring 60. The shaft 50 is near its upper end fixed to a diaphragm 62 that forms one wall of a pilot gas chamber 64 having a gas port 66 which communicates via a conduit 68 with the upstream side of the orifice 44. Accordingly, the pressure in the chamber 64 equals that on the upstream side of the orifice 44 while the pressure on the other side of the diaphragm 62 equals the pressure on the downstream side of the orifice 44. An increase in the pressure on the upstream side of the orifice 44 occasioned by increasing the size of the passage through the valve 10 has the effect of increasing the pressure drop across the orifice 44 and hence the difference between the opposite sides of the diaphragm 62 with the result that the shaft 50 is subjected to a net downward displacement reducing the size of the opening 58. Accordingly, although the pressure upstream of the opening or opening 58 increases, the size of this opening decreases with the result that the overall flow rate remains substantially unaltered. Similarly, a fall in the pressure on the upstream side of the orifice 44 leads to a net reduction in the difference in pressure on the two sides of the diaphragm 62 so that there is a net upward displacement of the shaft 50 and hence an increase in the size of the opening 58. This increase in the size of the opening 58 compensates for the net reduction in pressure upstream thereof with the result that the flow rate through the valve remains substantially unaltered.

Figure 3:
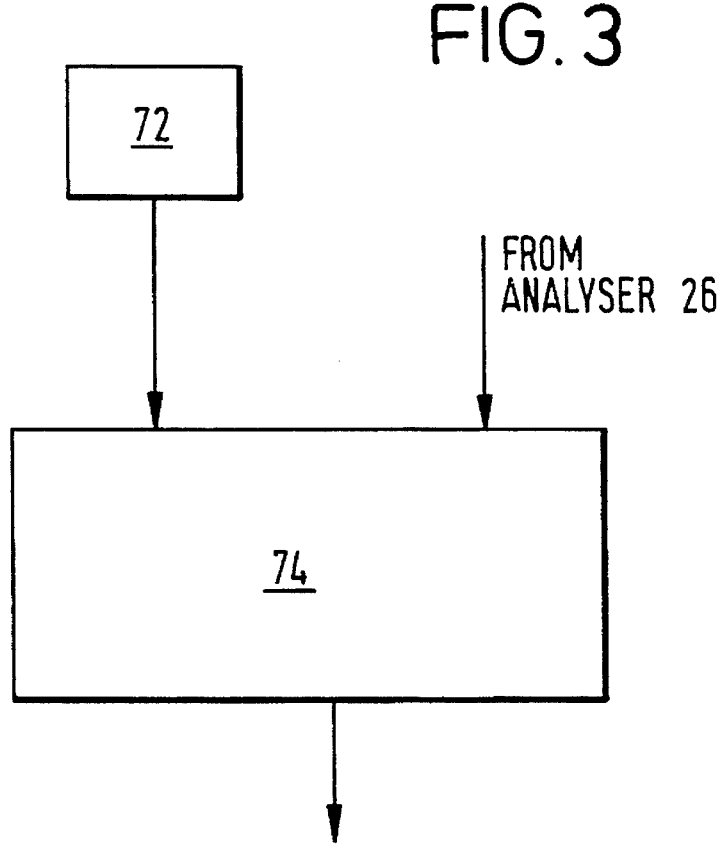
FIG. 3 is a schematic circuit diagram illustrating apparatus for controlling the position of the flow control valve in the air supply pipeline of the apparatus shown in FIG. 1.

A conventional oxygen analyser may be used as the analyser 26. The valve controller 28 may typically take the form of the apparatus shown in FIG. 3. The controller 28 has a programmable reference signal generator 72 which feeds a (voltage) signal to a comparator 74 which compares it with the signal from the analyser 26. The comparator 74 comprises electrical circuits adapted to generate a control signal if there is a difference between the two signals it receives. The flow control valve 10 may be motorised. If the difference between the signals received by the comparator 74 is in the favour of the reference signal (that is to say that the level of oxygen impurity has fallen below the desired value) the control signal can be employed to cause the motor to rotate in a valve closing sense while if the difference in the two signals sent to the comparator is in favour of the signal produced by the analyser (that is to say that the concentration of oxygen impurity in the product gas is greater than desired) then a control signal causing the motor to rotate in a valve opening direction is generated.

The apparatus according to the invention is thus able to supply product nitrogen at a desired purity and flow rate.

I claim:

1. Apparatus for separating a gas mixture comprising a vessel housing semi-permeable membranes effective to separate the mixture via permeation into a permeate gas and a non-permeate gas and having a single inlet for the gas mixture to be separated, a first outlet for product gas and a second outlet for a gas stream of different composition from that of the product gas, a first flow control valve for controlling the flow of all of the gas mixture to be separated to said inlet, control means for adjusting the position of said first flow control valve in response to analysis of the composition of the product gas, and a second flow control valve for controlling the flow of product gas from the first outlet, said second control valve capable of delivering product gas at a constant flow rate over a range of different pressures upstream thereof, additionally including a valve regulating the pressure upstream thereof downstream of the second control valve so as to make it possible to maintain in operating of the apparatus a constant pressure intermediate the second control valve and the pressure regulating valve.

2. Apparatus as claimed in claim 1, in which the control means for the first flow control valve includes means for comparing a signal for a gas analyser sensitive to the concentration of a component considered an impurity in the product gas with a reference signal representative of the desired level of that impurity, and for generating a signal to change the position of the first flow control valve in the event that there is a difference between the two signals being compared.

3. Apparatus as claimed in claim 2, including means for delivering the non-permeate gas as product.

4. Apparatus as claimed in claim 1, additionally including a compressor of the gas mixture to be separated which is of the constant displacement type.

5. Apparatus as claimed in claim 1 in which the second flow control valve is of a kind which has an orifice upstream of a valve member, a pilot gas chamber which is in communication with the upstream side of the orifice and which is bounded by one side of a diaphragm which on its other side is subject to the pressure downstream of the orifice, hereby in use an increasing pressure difference across the diaphragm causes the diaphragm to urge a valve member in a valve closing direction, whereby to maintain substantially constant the flow of gas delivered by the valve.

6. Apparatus as claimed in claim 1, additionally including a valve regulating the pressure upstream thereof downstream of the second control valve so as to make it possible to maintain in operating of the apparatus a constant pressure intermediate the second control valve and the pressure regulating valve.

* * * * *